United States Patent
Breger et al.

(10) Patent No.: US 12,063,251 B1
(45) Date of Patent: *Aug. 13, 2024

(54) METHODS FOR IMPROVED NETWORK SECURITY FOR WEB APPLICATIONS AND DEVICES THEREOF

(71) Applicant: F5 Networks, Inc., Seattle, WA (US)

(72) Inventors: Ido Breger, Tel Aviv (IL); Irena Guy, Tel Aviv (IL)

(73) Assignee: F5, Inc., Seattle, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/075,020

(22) Filed: Oct. 20, 2020

Related U.S. Application Data

(60) Provisional application No. 62/936,990, filed on Nov. 18, 2019.

(51) Int. Cl.
G06F 21/00 (2013.01)
H04L 9/40 (2022.01)
H04L 69/22 (2022.01)

(52) U.S. Cl.
CPC ...... H04L 63/1491 (2013.01); H04L 63/1433 (2013.01); H04L 69/22 (2013.01)

(58) Field of Classification Search
CPC .. H04L 63/1491; H04L 63/1433; H04L 69/22
See application file for complete search history.

(56) References Cited

U.S. PATENT DOCUMENTS

2011/0214182 A1* 9/2011 Adams ............... H04L 63/1408
726/23
2014/0298469 A1* 10/2014 Marion .............. H04L 63/1416
726/23

(Continued)

OTHER PUBLICATIONS

F5 Networks Inc., "Big-IP Application Security Manager: Getting Started®", Manual, Nov. 13, 2017, 46 pages, vol. 13.1, F5 Networks, Inc., Retrieved from the Internet:<https://techdocs.f5.com/kb/en-us/products/big-ip_asm/manuals/product/asm-getting-started-13-1-0.html>.

(Continued)

*Primary Examiner* — Michael M Lee
(74) *Attorney, Agent, or Firm* — Troutman Pepper Hamilton Sanders LLP

(57) ABSTRACT

Methods, non-transitory computer readable media, attack mitigation apparatuses, and network security systems that improve network security for web applications are illustrated. With this technology, a web application resource associated with a protected web application is obtained from a server following receipt of a request for the web application resource from a client. A determination is made when the client is suspicious, and when the determination indicates the client is suspicious. The web application resource is modified by injecting a honeypot into source code of the resource. The honeypot comprises a conviction trap that can be engaged by the client. The modified web application resource is then sent to the client in a response to the request for the web application resource. Subsequently the client can be convicted as malicious if it is determined that the honeypot is engaged, thereby providing a more effective and accurate identification of manual attackers.

20 Claims, 5 Drawing Sheets

(56) References Cited

U.S. PATENT DOCUMENTS

| | | | | |
|---|---|---|---|---|
| 2015/0067848 | A1* | 3/2015 | Baikalov | H04L 63/1416 726/23 |
| 2015/0121529 | A1* | 4/2015 | Quinlan | H04W 12/121 726/23 |
| 2017/0223052 | A1* | 8/2017 | Stutz | H04L 63/1491 |
| 2018/0020024 | A1* | 1/2018 | Chao | H04L 63/1425 |
| 2018/0167412 | A1* | 6/2018 | Barrett | H04L 63/1491 |
| 2018/0241774 | A1* | 8/2018 | Zhao | H04L 63/1416 |
| 2019/0068640 | A1* | 2/2019 | Araujo | G06F 21/53 |
| 2019/0318081 | A1* | 10/2019 | Gupta | G06F 8/70 |
| 2019/0334940 | A1* | 10/2019 | Bar Noy | H04L 63/1416 |
| 2020/0204589 | A1* | 6/2020 | Strogov | H04L 63/1416 |

OTHER PUBLICATIONS

F5 Networks Inc., "Assigning Attack Signatures to Security Policies", Manual, 2019, 6 pages, F5 Networks, Inc., Retrieved from the Internet:<https://techdocs.f5.com/kb/en-us/products/big-ip_asm/manuals/product/big-ip-asm-attack-and-bot-signatures-14-1-0/01.html#guid-9e8b2b2f-1325-4715-a879-311c802b2e97>.

F5 Networks Inc., "Big-IP 15.0.1 New and Installation" Release Notes, 2019, 33 pages, Version 15.0.1, F5 Networks, Inc., Retrieved from the Internet:<https://techdocs.f5.com/kb/en-us/products/big-ip_ltm/releasenotes/product/relnote-bigip-15-0-1.html>.

\* cited by examiner

METHODS FOR IMPROVED NETWORK SECURITY FOR WEB APPLICATIONS AND DEVICES THEREOF

This application claims the benefit of U.S. Provisional Patent Application Ser. No. 62/936,990, filed Nov. 18, 2019, which is hereby incorporated by reference in its entirety.

FIELD

This technology generally relates to computer network security and, more particularly, to methods and devices for identifying and mitigating network attacks on web applications.

BACKGROUND

Web application firewalls generally monitor network traffic exchanged with protected web applications hosted by servers in order to prevent network attacks. Such devices often have a high total cost of ownership because continual tuning is required, generally by relatively experienced administrators. Web applications often experience rapid updates, resulting in reduced effectiveness for web application firewalls because there is limited time to learn application behaviors required to distinguish between benign and malicious network traffic.

Moreover, benign users of web applications initially have the same amount of friction introduced by web application firewalls as malicious users because all users are taken through the same set of rules or an associated policy engine. Such friction results in reduced performance for valid users. Further, web application firewalls often have high associated false positive rates, which is inherent in the use of attack signatures and other current methods for detecting malicious behavior.

While web application firewalls are relatively good at preventing automated attacks (e.g., by bots) and attacks associated with common vulnerability and exposure (CVE) signatures, they are less effective at identifying and mitigating manual, targeted attacks by relatively skilled attackers. Such invalid users often leverage and analyze the blocking of their request traffic in order to reverse engineer the policy engine and identify and exploit vulnerabilities. Accordingly, current web application firewalls have limited ability to prevent many types of network attacks against protected web applications.

SUMMARY

A method for network security is disclosed that is implemented by a network security system, including one or more attack mitigation apparatuses, web application firewall devices, behavior analysis devices, server devices, or client devices, and includes obtaining a web application resource associated with a protected web application from a server following receipt of a request for the web application resource from a client. A determination is made when the client is suspicious, and when the determination indicates the client is suspicious. The web application resource is modified by injecting a honeypot into source code of the resource. The honeypot comprises a conviction trap that can be engaged by the client. The modified web application resource is then sent to the client in a response to the request for the web application resource.

An attack mitigation apparatus is disclosed that includes memory including programmed instructions stored thereon and one or more processors configured to be capable of executing the stored programmed instructions to obtain web application resource associated with a protected web application from a server following receipt of a request for the web application resource from a client. A determination is made when the client is suspicious, and when the determination indicates the client is suspicious. The web application resource is modified by injecting a honeypot into source code of the resource. The honeypot comprises a conviction trap that can be engaged by the client. The modified web application resource is then sent to the client in a response to the request for the web application resource.

A non-transitory computer readable medium is disclosed that has stored thereon instructions for network security includes executable code that, when executed by one or more processors, causes the processors to obtain web application resource associated with a protected web application from a server following receipt of a request for the web application resource from a client. A determination is made when the client is suspicious, and when the determination indicates the client is suspicious. The web application resource is modified by injecting a honeypot into source code of the resource. The honeypot comprises a conviction trap that can be engaged by the client. The modified web application resource is then sent to the client in a response to the request for the web application resource.

A network security system is disclosed that includes one or more one or more attack mitigation apparatuses, web application firewall devices, behavior analysis devices, server devices, or client devices with memory including programmed instructions stored thereon and one or more processors configured to be capable of executing the stored programmed instructions to obtain web application resource associated with a protected web application from a server following receipt of a request for the web application resource from a client. A determination is made when the client is suspicious, and when the determination indicates the client is suspicious. The web application resource is modified by injecting a honeypot into source code of the resource. The honeypot comprises a conviction trap that can be engaged by the client. The modified web application resource is then sent to the client in a response to the request for the web application resource.

This technology has a number of associated advantages including methods, non-transitory computer readable media, attack mitigation apparatuses, and network security systems that more effectively identify and manage network attacks to reduce the impact of targeted, manual attacks on protected web applications. A behavioral analysis of client devices with respect to protected web applications is performed to inform a security policy and facilitate client scoring and identification of suspicious clients. Honeypots are advantageously utilized to convict suspicious clients resulting in the initiation of deceptive response that prevent reverse engineering of the security policy. This technology minimizes the friction experienced by valid users by tailoring the security policy to identify potentially invalid users earlier and more effectively.

DETAILED DESCRIPTION

Figure 1:
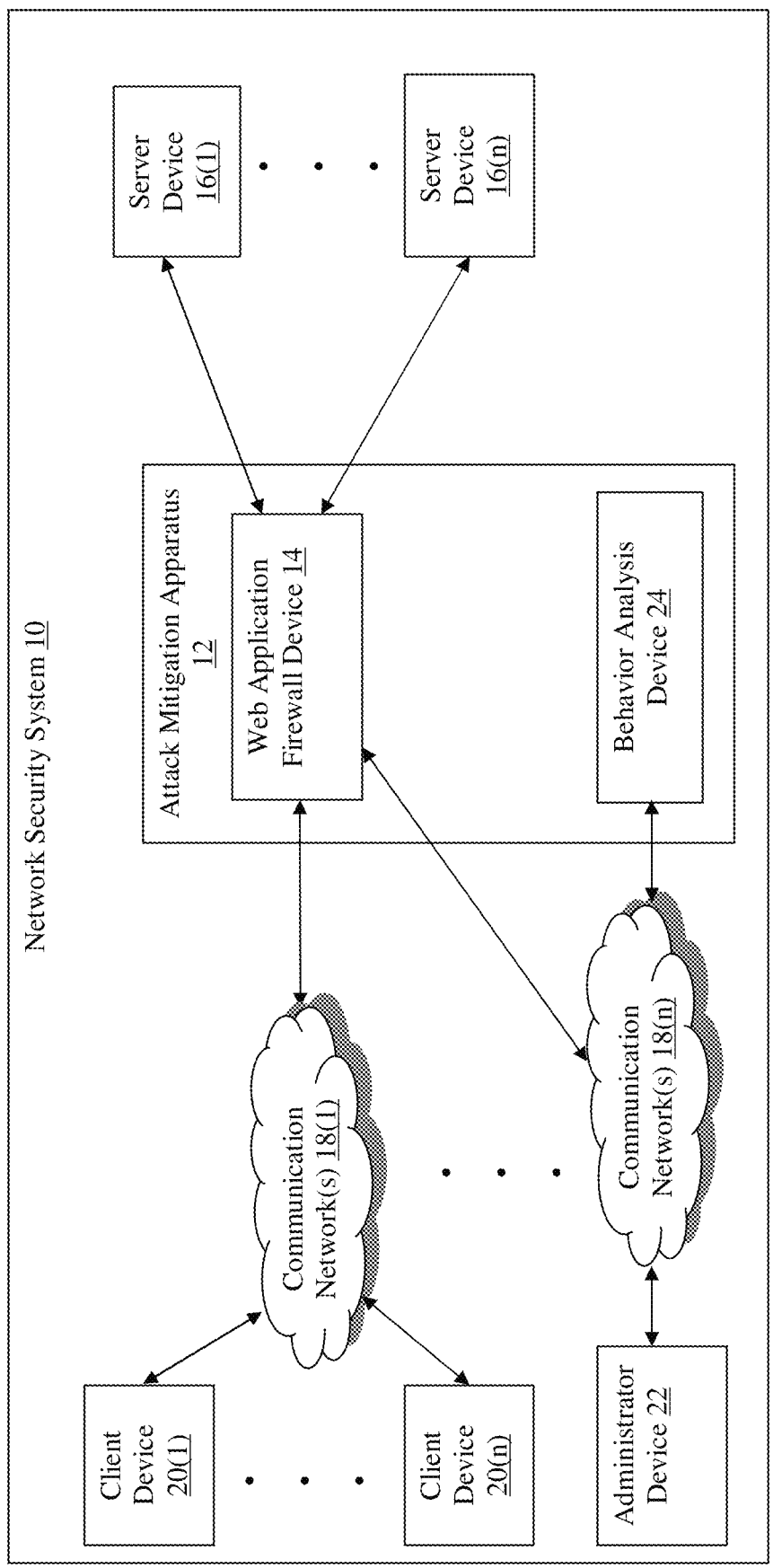
FIG. 1 is a block diagram of an exemplary network security system with an attack mitigation apparatus.

Referring to FIG. 1, an exemplary network environment that incorporates an exemplary network security system 10 is illustrated. The network security system 10 in this example includes an attack mitigation apparatus 12 that includes a web application firewall (WAF) device 14 that is coupled to server devices 16(1)-16(n) and, via communication network(s) 18(1), client devices 20(1)-20(n). The WAF device 14 is also coupled, via communication network(s) 18(n), to an administrator device 22. Additionally, the attack mitigation apparatus 12 in this example includes a behavior analysis device 24 that is also coupled to the administrator device 22 via the communication network(s) 18(n).

The WAF device 14, server devices 16(1)-16(n), client devices 20(1)-20(n), administrator device 22, and behavior analysis device 24 may be coupled together via other topologies. The network security system 10 also may include other network devices such as one or more routers or switches, for example, which are known in the art and thus will not be described herein. This technology provides a number of advantages including methods, non-transitory computer readable media, network security systems, and attack mitigation apparatuses that more effectively identify and convict network attackers, and use deception to reduce reverse engineering of network security policies, to thereby improve network security for protected web applications.

In this particular example, the WAF device 14, behavioral analysis device 24, server devices 16(1)-16(n), and client devices 20(1)-20(n) are disclosed in FIG. 1 as dedicated hardware devices, but one or more of the WAF device 14, behavioral analysis device 24, server devices 16(1)-16(n), or client devices 20(1)-20(n) can also be implemented in software within one or more other devices in the network security system 10 in other examples. For example, the WAF device 14 can be hosted by one of the server devices 16(1)-16(n) or the behavior analysis device 24. In another example, any number of WAF devices in any number of local networks can be coupled to the behavior analysis device 24, which is deployed in a cloud network, and other network configurations can also be used.

Figure 2:
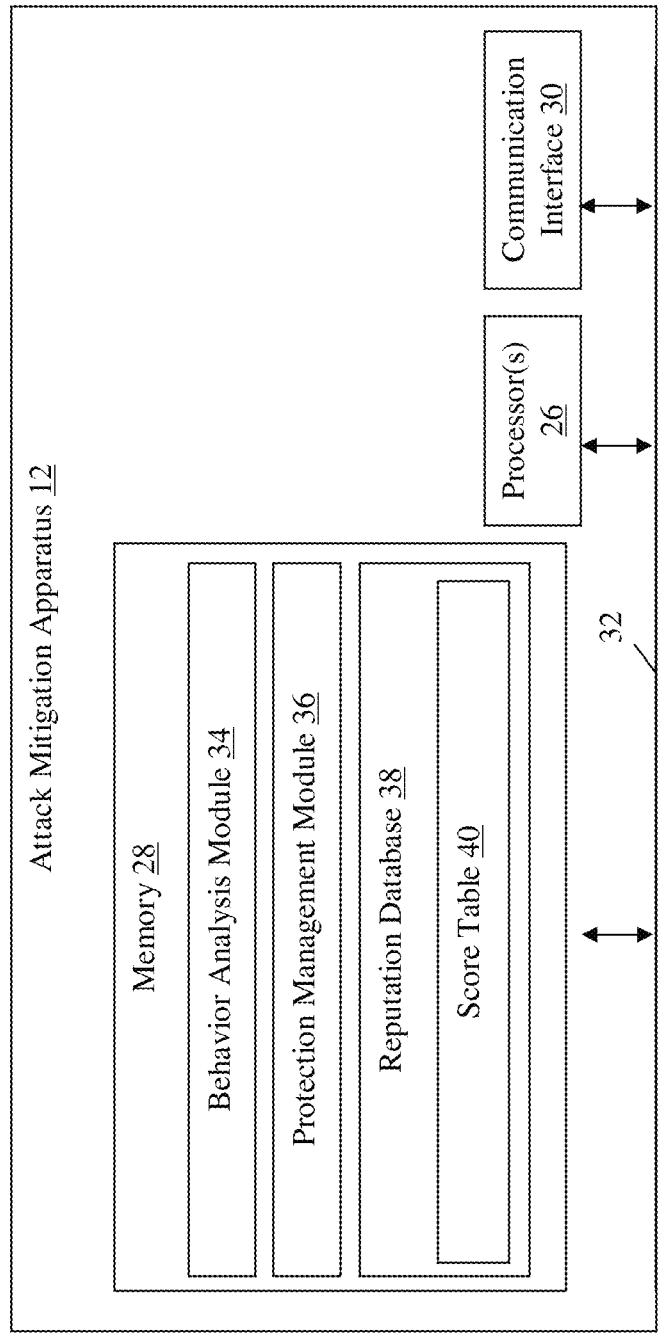
FIG. 2 is a block diagram of an exemplary attack mitigation apparatus.

Referring to FIGS. 1-2, the attack mitigation apparatus 12 of the network security system 10 may perform any number of functions in addition to detecting and mitigating network attacks, including managing network traffic, load balancing network traffic across the server devices 16(1)-16(n), or accelerating network traffic associated with applications hosted by the server devices 16(1)-16(n), for example. The attack mitigation apparatus 12 in this example includes processor(s) 26, memory 28, and a communication interface 30, which are coupled together by a bus 32, although the attack mitigation apparatus 12 can include other types or numbers of elements in other configurations.

The processor(s) 26 of the attack mitigation apparatus 12 may execute programmed instructions stored in the memory 28 of the attack mitigation apparatus 12 for any number of the functions identified above. The processor(s) 26 may include central processing unit(s) (CPU(s)) or general purpose processor(s) with processing core(s), for example, although other types of processor(s) can also be used.

The memory 28 of the attack mitigation apparatus 12 stores these programmed instructions for aspects of the present technology as described and illustrated herein, although some or all of the programmed instructions also could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 26, can be used for the memory 28.

Accordingly, the memory 28 can store application(s) that can include computer executable or programmed instructions that, when executed by the attack mitigation apparatus 12, cause the attack mitigation apparatus 12 to perform actions, such as to transmit, receive, or otherwise process messages, for example, and to perform other actions described and illustrated below with reference to FIGS. 3-5. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the attack mitigation apparatus 12 itself, may be located in virtual server(s) running in a cloud-based computing environment rather than being tied to one or more specific physical network computing devices. Also, the application(s) may be running in virtual machine(s) (VM(s)) executing on the attack mitigation apparatus 12. Additionally, in example(s) of this technology, virtual machine(s) running on the attack mitigation apparatus 12 may be managed or supervised by a hypervisor.

In this particular example, the memory 28 includes a behavior analysis module 34, protection management module 36, and a reputation database 38 storing a score table 40 including client scores, although other types of modules and applications can also be stored in the memory 28 in other examples. In some examples, the behavior analysis module 34 and reputation database 38 are hosted by the behavior analysis device 24 of the attack mitigation apparatus 12 and the protection management module 36 is hosted by the WAF device 14 of the attack mitigation apparatus 12, although other types of configurations can also be used in other examples.

The behavior analysis module 34 in this example analyzes network traffic to determine whether the network traffic originates with a bot or other autonomous program or application and determines whether the remainder of the network traffic is associated with one of the client devices 20(1)-20(n) that is suspicious or can be convicted as an attacker. Accordingly, the behavior analysis module 34 monitors network traffic exchanged with the protected web applications hosted by the server devices 16(1)-16(n) to model client behavior, and generate baseline behaviors, that can be compared to determine whether one of the client devices 20(1)-20(n) may be suspicious or convicted. Based on the monitoring, the behavior analysis module 34 generates scores that are provided to, and applied by, the protection management module 36, which manages security measures implemented against suspicious and convicted attackers.

Accordingly, the behavior analysis module 34 convicts clients devices 20(1)-20(n) communicating with protected web applications hosted by the server devices 16(1)-16(n) based on a common vulnerability and exposure (CVE) signature match, engagement with a honeypot, or a score above a suspicion or conviction score threshold (e.g., based on a number of security policy violations), for example, although other basis for conviction can also be used in other examples. The protection management module 36 then implements security measures based on the score returned from the behavior analysis module 34 for particular one of the client devices 20(1)-20(n), such as blocking request traffic, introducing honeypots, or generating and returning deceptive responses, as described and illustrated in more detail later.

The reputation database 38 in this example stores the scores generated by the behavior analysis module 34 for the client devices 20(1)-20(n). The reputation database 38 also stores an indication or marking as to whether one of the client devices 20(1)-20(n) is currently suspicious or convicted as an attacker in this example. Optionally, the reputation database 38 can store historical information regarding client devices 20(1)-20(n), such as web application access and behavior information, scores, prior convictions, or reputation information obtained from third parties, for example. Also optionally, client devices 20(1)-20(n) can be uniquely identified by the attack mitigation apparatus 12 based on a fingerprint that is persistent across sessions and used to store associated information in the reputation database 38.

Referring back to FIGS. 1-2, the communication interface 30 of the attack mitigation apparatus 12 operatively couples and communicates between the server devices 16(1)-16(n), client devices 20(1)-20(n), and administrator device 22, and optionally between the WAF device 14 and the behavior analysis device 24, which are coupled together at least in part by the communication network(s) 18(1)-18(n), although other types or numbers of communication networks or systems with other types or numbers of connections or configurations to other devices or elements can also be used.

By way of example only, the communication network(s) 18(1)-18(n) can include local area network(s) (LAN(s)) or wide area network(s) (WAN(s)), and can use TCP/IP over Ethernet and industry-standard protocols, although other types or numbers of protocols or communication networks can be used. The communication network(s) 18(1)-18(n) in this example can employ any suitable interface mechanisms and network communication technologies including, for example, Ethernet-based Packet Data Networks (PDNs) hosting HyperText Transfer Protocol (HTTP), for example.

The attack mitigation apparatus 12 is illustrated in this example as including multiple devices, each of which has processor(s) (each processor with processing core(s)) that implement step(s) of this technology. In these examples, one or more of the devices can have a dedicated communication interface or memory. Alternatively, one or more of the devices can utilize the memory, communication interface, or other hardware or software components of one or more other of the devices included in the attack mitigation apparatus 12.

Accordingly, one or more of the devices that together comprise the attack mitigation apparatus 12 can be stand-alone devices or integrated with one or more other devices or apparatuses, such as one or more of the server devices 16(1)-16(n), for example. Moreover, one or more of the devices of the attack mitigation apparatus 12 can be in a same or a different communication network including one or more public, private, or cloud networks, for example. In yet other examples, a plurality of WAF devices are deployed, within and/or outside of the local area network associated with the server devices 16(1)-16(n), which communicate with the behavior analysis device 24, which is deployed in a cloud network, and other network topologies can also be used.

Each of the server devices 16(1)-16(n) of the network security system 10 in this example includes processor(s), memory, and a communication interface, which are coupled together by a bus or other communication link (not illustrated), although other numbers or types of components could be used. The server devices 16(1)-16(n) in this example can include application servers that exchange communications to facilitate interactions with hosted web applications, which are optionally protected by the attack mitigation apparatus 12 as described and illustrated herein, by users of the client devices 20(1)-20(n).

Accordingly, in some examples, one or more of the server devices 16(1)-16(n) process login and other requests received from the client devices 20(1)-20(n) via the communication network(s) 18(1)-18(n) according to the HTTP-based application RFC protocol, for example. A protected web application may be operating on one or more of the server devices 16(1)-16(n) and transmitting data (e.g., files or web pages) to the client devices 20(1)-20(n) in response to requests from the client devices 20(1)-20(n). The server devices 16(1)-16(n) may be hardware or software or may represent a system with multiple servers in a pool, which may include internal or external networks.

Although the server devices 16(1)-16(n) are illustrated as single devices, one or more actions of each of the server devices 16(1)-16(n) may be distributed across one or more distinct network computing devices that together comprise one or more of the server devices 16(1)-16(n). Moreover, the server devices 16(1)-16(n) are not limited to a particular configuration. Thus, the server devices 16(1)-16(n) may contain network computing devices that operate using a master/slave approach, whereby one of the network computing devices of the server devices 16(1)-16(n) operate to manage or otherwise coordinate operations of the other network computing devices. The server devices 16(1)-16(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 16(1)-16(n) can operate within the attack mitigation apparatus 12 (e.g., the WAF device 24) itself rather than as a stand-alone server communicating with the attack mitigation apparatus 12 via communication network(s). In this example, the one or more of the server devices 16(1)-16(n) operate within the memory 28 of the attack mitigation apparatus 12.

The client devices 20(1)-20(n) of the network security system 10 in this example include any type of computing device that can exchange network data and interface with an application hosted by one or more of the server devices 16(1)-16(n), such as mobile, desktop, laptop, or tablet computing devices, virtual machines (including cloud-based computers), or the like. Each of the client devices 20(1)-20(n) in this example includes a processor, memory, and a communication interface, which are coupled together by a bus or other communication link (not illustrated), although other numbers or types of components could also be used.

The client devices 20(1)-20(n) may run interface applications, such as standard web browsers or native client applications, which may provide an interface to make requests for, and receive content stored on, one or more of the server devices 20(1)-20(n) via the communication network(s) 18(1)-18(n). The client devices 20(1)-20(n) may further include a display device, such as a display screen or touchscreen, or an input device, such as a keyboard, for example (not illustrated).

The administrator device 22 includes any type of computing device that can exchange network data and interface with the WAF device 14 and/or behavior analysis device 24, such as a mobile, desktop, laptop, or tablet computing device, for example. Accordingly, the administrator device 22 includes a processor, memory, and a communication interface, which are coupled together by a bus or other communication link (not illustrated), and can further include a display device, such as a display screen or touchscreen, or an input device, such as a keyboard for example (not illustrated), although other numbers or types of components could also be used. The administrator device 22 can be used to obtain dashboards and alerts to facilitate detection, investigation, or mitigation of potential network attacks, as described and illustrated in more detail below.

Although the exemplary network security system 10 with the attack mitigation apparatus 12, server devices 16(1)-16(n), client devices 20(1)-20(n), administrator device 22, and communication network(s) 18(1)-18(n) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the attack mitigation apparatus 12, server devices 16(1)-16(n), client devices 20(1)-20(n), or administrator device 22, for example, may be configured to operate as virtual instances on the same physical machine. In other words, one or more of the attack mitigation apparatus 12, server devices 16(1)-16(n), client devices 20(1)-20(n), or administrator device 22 may operate on the same physical device rather than as separate devices communicating through communication network(s). Additionally, there may be more or fewer attack mitigation apparatuses, client devices, server devices, or administrator devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having executable or programmed instructions stored thereon, such as in the memory 28 of the attack mitigation apparatus 12, for one or more aspects of the present technology, as described and illustrated by way of the examples herein. The instructions in some examples include executable code that, when executed by one or more processors, such as the processor(s) 26 of the attack mitigation apparatus 12, cause the processors to carry out steps necessary to implement the methods of the examples of this technology that are described and illustrated herein.

An exemplary method of improved network security for web applications will now be described with reference to FIGS. 1-5. Referring more specifically to FIG. 3, an example of a method of processing request traffic directed to a protected web application is illustrated. In step 300 in this example, the attack mitigation apparatus 12 receives a request from one of the client devices 20(1)-20(n) for a web application resource associated with a protected web application. The protected web application can be hosted by one of the server devices 16(1)-16(n) and the request can be intercepted by the WAF device 14 of the attack mitigation apparatus 12, for example, which is interposed between the one of the client devices 20(1)-20(n) and the one of the server devices 16(1)-16(n) in this example.

In step 302, the attack mitigation apparatus 12 generates a score that can be compared with conviction and suspicion score thresholds, although other uses of the score, and/or methods for categorizing the client devices 20(1)-20(n) as suspicious or convicted, can also be used in other examples. The score for the one of the client devices 20(1)-20(n) in this example is based on the activity of the one of the client devices 20(1)-20(n) with respect to the protected web application to which the request received in step 300 was directed.

The attack mitigation apparatus 12 in this example monitors and analyzes the behavior of the client devices 20(1)-20(n) as compared to an expected behavior of a user of the protected web application. Based on the analysis, the attack mitigation apparatus 12 generates a score for new users of the client devices 20(1)-20(n), and updates a score for current users of the client devices 20(1)-20(n) with an established connection to the protected web application, for example, which is representative of the likelihood that an associated user is an attacker of the protected web application. The scores can be maintained in the reputation database 38 in entries of the score table 40 indexed or keyed by client device fingerprints, for example, although other methods for organizing the score table 40 can also be used.

In one exemplary behavior, an attacker is likely to send different parameters to web pages associated with a protected web application to determine how the protected web application responds or behaves. In another example, an attacker may attempt to profile a protected web application to learn the associated components and attempt to find vulnerabilities.

In yet other examples, attackers are likely to follow an atypical flow through a protected web application, request web pages out of order, request web pages more quickly, and initiate with a protected web application at different landing pages, although many other types of behaviors can also be observed and analyzed to inform the generated or updated score. An exemplary method for generating and maintaining scores, which are also referred to as flow scores, is described and illustrated in more detail in U.S. patent application Ser. No. 15/710,552, which is hereby incorporated by reference in its entirety.

In step 304, the attack mitigation apparatus optionally determines whether the one of the client devices 20(1)-20(n) represents an autonomous program or application commonly referred to herein as a bot. In some examples, a bot can be detected based on utilization of a headless browser determined based on a user agent or other characteristic of the request received in step 300 and, in other examples, a bot can be detected based on a particular behavior (e.g., an automated scan of the protected web application). Other methods of detecting bots can also be used in other examples. The determination in step 304 is only relevant to, and is optionally only performed in, examples of this technology in which the attack mitigation apparatus 12 is configured to identify vulnerability scanning behavior by a bot. If the attack mitigation apparatus 12 in this example determines that a bot has been detected, then the Yes branch is taken to step 306.

In step 306, the attack mitigation apparatus 12 optionally blocks the request received in step 300, or sends a Completely Automated Public Turing Test To Tell Computers and Humans Apart (CAPTCHA) or other challenge-response test in response to the received request to force the one of the client devices 20(1)-20(n) to prove that it is not a bot. Other types of responses can also be used in other examples. Subsequent to responding to the suspected bot, the attack mitigation apparatus 12 proceeds back to step 300 and receives another request from another one of the client devices 20(1)-20(n) in this example. However, referring back to step 304, if the attack mitigation apparatus 12 determines that a bot is not suspected or detected, then the No branch is taken to step 308.

In step 308, the attack mitigation apparatus optionally determines whether the one of the client devices 20(1)-20(n) represents a CVE signature match. While bot detection and CVE signature match are illustrated in steps 304 and 308 in this example, other types of network attackers can be automatically and relatively confidently identified based on other characteristics in other examples. If the attack mitigation apparatus 12 determines that the one of the client devices 20(1)-20(n) does not represent a CVE signature match, then the No branch is taken to step 309.

In step 309, the attack mitigation apparatus 12 determines whether the score for the one of the client devices 20(1)-20 (n) exceeds a conviction score threshold. The score can reach the conviction score threshold following a particular number of violations of a security policy (e.g., based on anomalous observed behavior with the web application), for example.

In another example, the score can reach the conviction score threshold when the one of the client devices 20(1)-20 (n) engages a honeypot. A link to a honeypot could have been introduced into source code of a resource previously returned to the one of the client devices 20(1)-20(n), as described and illustrated in more detail later with reference to step 404 of FIG. 4, for example. The link to the honeypot represents a conviction trap that is capable of being engaged, or likely to be traversed, by a manual, targeted attacker of the protected web application, leading to a more accurate conviction. Other types of honeypots can also be used in other examples, as described and illustrated in more detail later.

The score for the one of the client devices 20(1)-20(n) can also exceed the conviction score threshold in other ways in other examples. If the attack mitigation apparatus 12 determines in step 308 that the one of the client devices 20(1)-20(n) represents a CVE signature match and the Yes branch is taken, or in step 309 that the score for the one of the client devices 20(1)-20(n) exceeds the conviction score threshold and the Yes branch is taken, then the attack mitigation apparatus 12 proceeds to step 310.

In step 310, the attack mitigation apparatus 12 marks the one of the client devices 20(1)-20(n) as convicted, or maintains a previous conviction marking in the reputation database 38, for example. Optionally, a timestamp of a current time can also be stored in the entry for newly-convicted ones of the client devices 20(1)-20(n). Also optionally, the attack mitigation apparatus 12 can generate an alert to the administrator device 24 that includes identifying information for the one of the client devices 20(1)-20(n) and/or data regarding the behavior of the one of the client devices 20(1)-20(n) with respect to the protected web application.

In step 312, the attack mitigation apparatus 12 generates, and returns to the one of the client devices 20(1)-20(n), a deceptive response. The deceptive response can include sending an error message to the one of the client devices 20(1)-20(n), dropping the request, sending a fake response to the one of the client devices 20(1)-20(n), introducing one or more random headers into a response to the one of the client devices 20(1)-20(n), or sending a partial response to the one of the client devices 20(1)-20(n), for example.

In one example, the types of deceptive responses that are returned can escalate or de-escalate with respect to associated friction. The de-escalation in one example can be based on the amount of time that has elapsed subsequent to conviction. In another example, the friction of the deceptive response(s) can increase when the convicted one of the client devices 20(1)-20(n) takes an illegal action associated with a low accuracy violation of the security policy, for example. The types of deceptive responses can be adjusted over time based on other criteria in other examples.

By returning a deceptive response, the attack mitigation apparatus 12 reduces the ability of a user of the one of the client devices 20(1)-20(n) to reverse engineer the security policy. Optionally, the deceptive response can be determined or selected based on a reputation score for the one of the client devices 20(1)-20(n) that is stored in the reputation database 28 and is different than the score generated in step 302. The reputation score can be determined based on historical interactions between the one of the client devices 20(1)-20(n) and the attack mitigation apparatus 12, including historical scores, or data obtained from a third party (e.g., based on the fingerprint) that is indicative of a reputation of the one of the client devices 20(1)-20(n) based on historical interactions with other web applications optionally hosted in other networks, for example.

Accordingly, if a reputation score indicates that the one of the client devices 20(1)-20(n) has a relatively poor reputation indicating an increased likelihood that the user of the one of the client devices 20(1)-20(n) is an attacker, the deceptive response can introduce more friction for the one of the client devices 20(1)-20(n), for example. In examples in which a response (optionally a partial response or a response with random headers, for example) is returned, the attack mitigation apparatus 12 can send a simulated request to the one of the server devices 16(1)-16(n) to obtain the response so that the original request received in step 300, which may be infected, is restricted from transmission to the one of the server devices 16(1)-16(n) thereby eliminating any risk to the protected web application associated with the original request. Other types of reputation indications based on other parameters can be used, and the deceptive response also can be generated or selected based on other factors in other examples.

In step 314, the attack mitigation apparatus optionally determines whether a time period of conviction for the one of the client devices 20(1)-20(n) has expired. In this example, a convicted one of the client devices 20(1)-20(n) is optionally blocked after a specified time period has expired following any number of deceptive responses. Deception is utilized to encourage an attacker to abandon the attack without immediately blocking the network traffic originating with a convicted attacker, which might otherwise provide clues that could facilitate reverse engineering of the security policy.

The determination in step 314 can be based on a current time and a timestamp maintained in an entry of the reputation database 28 associated with the one of the client devices 20(1)-20(n) that was stored upon marking the one of the client devices 20(1)-20(n) as convicted in step 310, for example, although other methods for analyzing the time period can also be used. If the attack mitigation apparatus 12 determines that the time period has not expired, then the No branch is taken back to step 300. However, if the attack mitigation apparatus 12 determines that the time period has expired, then the Yes branch is taken to step 315.

In step 315, the attack mitigation apparatus 12 enters a war state from a peace state and optionally blocks the request received in step 300, although other types of security measures or mitigation actions can also be initiated in other examples. In the war state, unknown and convicted actors associated with the client devices 20(1)-20(n) are treated with a relatively strict security policy and good or benign actors are treated with a baseline security policy. Applying a relatively strict security policy on unknown actors mitigates the risk that a convicted actor will switch identities (e.g., altering the associated fingerprint).

Optionally, the attack mitigation apparatus 12 generates a notification to the administrator device 24 regarding the change from a peace state to a war state (and/or from a war state to a peace state in another iteration). Subsequent to entering the war state, the attack mitigation apparatus 12 proceeds back to step 300. Referring back to step 309, if the attack mitigation apparatus 12 determines that the score for the one of the client devices 20(1)-20(n) has not reached the conviction score threshold, then the No branch is taken to step 316.

In step 316, the attack mitigation apparatus 12 determines whether the score for the one of the client devices 20(1)-20(n) generated in step 302 exceeds a suspicion score threshold. In some examples, the suspicion score threshold corresponds with a particular level of confidence (e.g., 90%) that the one of the client devices 20(1)-20(n) is malicious, and is different (e.g., less than) than the conviction score threshold used in step 309, although other thresholds can also be used. In some examples, a relatively high number of relatively low accuracy violations of the security policy may result in the score exceeding the suspicion score threshold. If the attack mitigation apparatus 12 determines that the suspicion score threshold has been reached, then the Yes branch is taken to step 318.

In step 318, the attack mitigation apparatus 12 marks the one of the client devices 20(1)-20(n) as suspicious, or maintains a previous suspicious marking in the reputation database 28, for example. Subsequent to marking the one of the client devices 20(1)-20(n) as suspicious in step 318, or if the attack mitigation apparatus 12 determines that the suspicion score threshold has not been reached and the No branch is taken from step 316, then the attack mitigation apparatus 12 proceeds to step 320.

In step 320, the attack mitigation apparatus 12 sends the request received in step 300 to one of the server devices 16(1)-16(n) hosting the protected web application including the requested web application resource. In other examples, one or more of steps 300-320 can be performed in a different order and/or in parallel for any number of requests received from any number of the client devices 20(1)-20(n).

Figure 3:
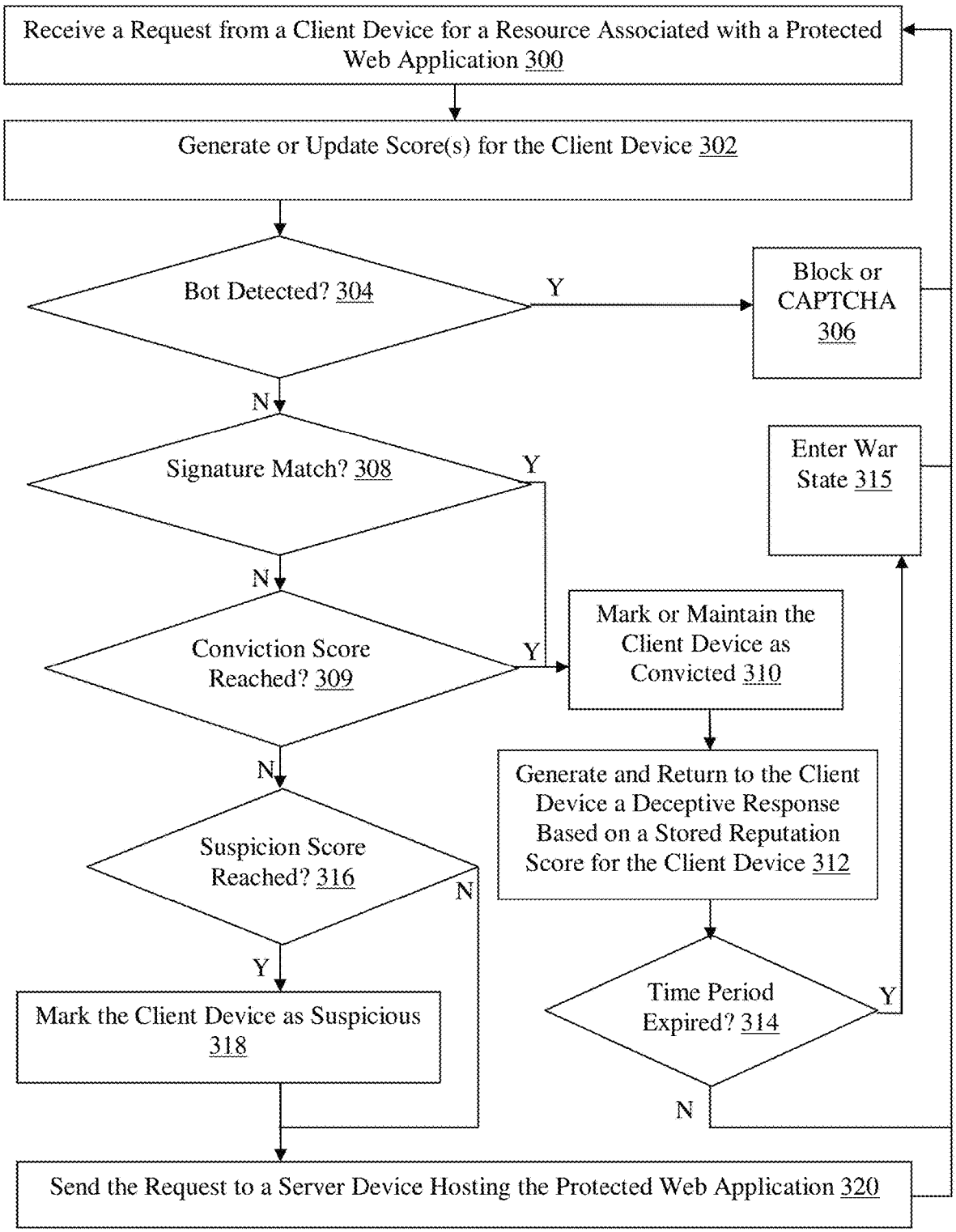
FIG. 3 is a flowchart of an exemplary method for processing request traffic directed to a protected web application.
Figure 4:
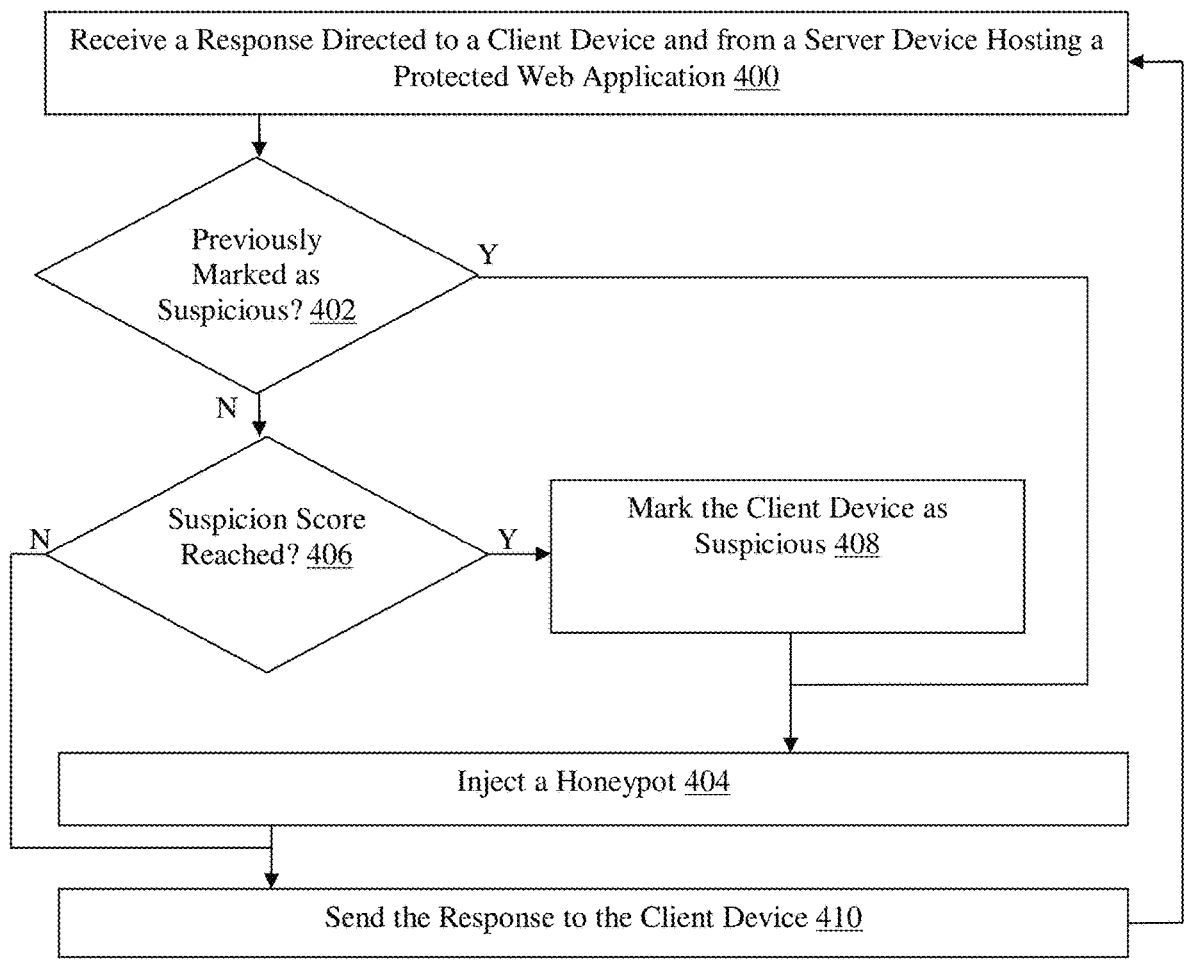
FIG. 4 is a flowchart of an exemplary method for processing response traffic originating with a protected web application.

Referring more specifically to FIG. 4, an example of a method of processing response traffic originating with a protected web application is illustrated. In step 400 in this example, the attack mitigation apparatus 12 of the network security system 10 receives a response directed to one of the client devices 20(1)-20(n) from one of the server devices 16(1)-16(n) that is hosting a protected web application. The response can include a resource associated with the protected web application that was previously requested by the one of the client devices 20(1)-20(n), such as in the request received in step 300 of FIG. 3, for example.

In step 402, the attack mitigation apparatus 12 determines whether the one of the client devices 20(1)-20(n) is marked as suspicious. The determination can be made using the reputation database 28 and a fingerprint of the one of the client devices 20(1)-20(n), for example, although the determination can also be made in other ways. If the one of the client devices 20(1)-20(n) is marked as suspicious, the attack mitigation apparatus 12 previously had a level of confidence that the one of the client devices 20(1)-20(n) is the source of an attack on the protected web application. The one of the client devices 20(1)-20(n) could have been marked as suspicious as described and illustrated in more detail earlier with reference to step 320 of FIG. 3, for example, although the one of the client devices 20(1)-20(n) could have been marked as suspicious in other ways in other examples. If the attack mitigation apparatus 12 determines that the one of the client devices 20(1)-20(n) is marked as suspicious, then the Yes branch is taken to step 404.

In step 404, the attack mitigation apparatus 12 injects a honeypot into the response. The honeypot in one example can be a link injected into source code of the response received in step 400, or a resource (e.g., a web page associated with a protected web application) included with the response. In this example, the link is to a predefined location that operates as a trap for a manual or other type of attacker of the protected web application that can be lured into traversing the link. Accordingly, the link can be injected at a location and in a format that is likely to attract an attacker.

The honeypot or link destination can be preconfigured and stored in the memory 28 of the attack mitigation apparatus 12 to facilitate comparison with a subsequent request. A subsequent request of the honeypot, based on traversal of the link injected into the source code of the resource associated with the response, can result in conviction of the one of the client devices 20(1)-20(n). In other examples, other types of honeypots can be injected, such as cookies or comments, and other types of responses configured to lure an attacker to engage the honeypot can also be used in other examples. However, if the attack mitigation apparatus 12 determines in step 402 that the one of the client devices 20(1)-20(n) is not marked as suspicious and the No branch is taken, then the attack mitigation apparatus 12 proceeds to step 406.

In step 406, the attack mitigation apparatus 12 determines whether the score for the one of the client devices 20(1)-20(n) exceeds a suspicion score threshold, which corresponds to the inquiry described and illustrated earlier with reference to step 316 of FIG. 3. If the attack mitigation apparatus 12 determines that the score of the one of the client devices 20(1)-20(n) exceeds the suspicion score threshold, then the Yes branch is taken to step 408.

In step 408, the attack mitigation apparatus 12 marks the one of the client devices 20(1)-20(n) as suspicious, as described and illustrated in more detail earlier with reference to step 318 of FIG. 3. Subsequent to marking the one of the client devices 20(1)-20(n) as suspicious, the web application firewall device in this example proceeds to inject a honeypot in step 404. Subsequent to injecting the honeypot in step

404, or if the attack mitigation apparatus 12 determines in step 406 that the suspicion score threshold has not been reached and the No branch is taken, then the attack mitigation apparatus 12 proceeds to step 410.

In step 410, the attack mitigation apparatus 12 sends the response to the one of the client devices 20(1)-20(n). In other examples, one or more of steps 400-410 can be performed in a different order and/or in parallel for one or more responses received from one of more of the server devices 16(1)-16(n) and associated with sessions facilitated between one or more of the client devices 20(1)-20(n) and the one or more of the server devices 16(1)-16(n).

Figure 5:
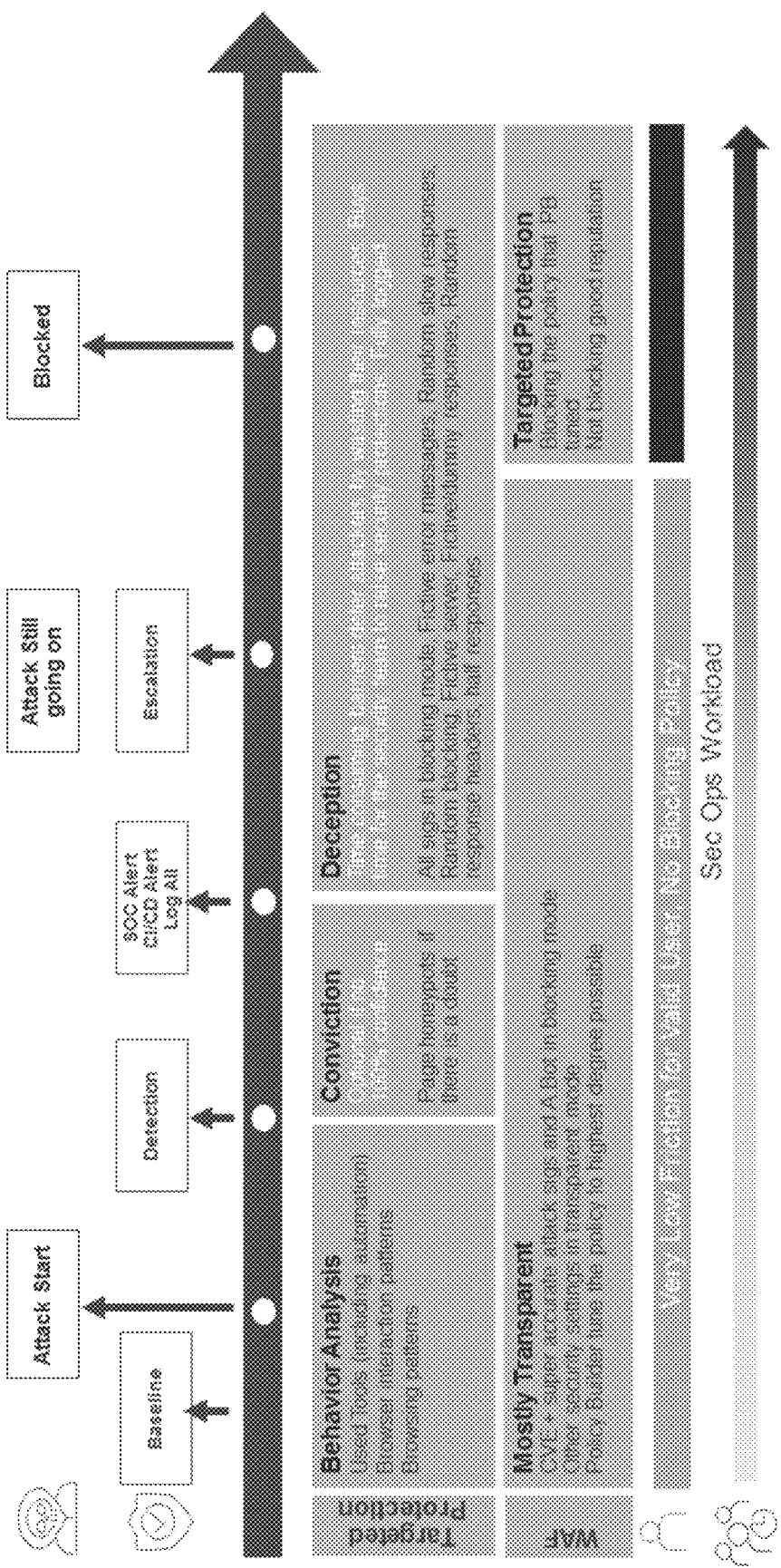
FIG. 5 is a timeline of targeted protection for a protected web application to facilitate improved network security.

Referring more specifically to FIG. 5, a timeline of targeted protection for a protected web application to facilitate improved network security is illustrated. In this example, the behavior analysis device 24 of the attack mitigation apparatus 12 obtains a baseline behavioral analysis of a protected web application by monitoring network traffic exchanged between the client devices 20(1)-20(n) and the protected web application hosted by one of the server devices 16(1)-16(n) over a period of time. During this stage, the bot detection implemented by the WAF device 14 of the attack mitigation apparatus 12 bot detection is in a blocking mode for those of the client devices 20(1)-20(n) determined to be bots. Additionally, CVE signature comparison is performed by the WAF device 14 in a deception mode for those of the client devices 20(1)-20(n) determined to be associated with manual users, and in a blocking mode for those of the client devices 20(1)-20(n) determined to be bots, but otherwise introduces relatively low friction for the client devices 20(1)-20(n).

Subsequent to an attack beginning, the WAF device 14 detects the attack and, in a conviction stage, determines that a score for one of the client devices 20(1)-20(n) exceeds a suspicion score threshold and optionally injects a honeypot to attempt to convict an attacker that may be associated with the one of the client devices 20(1)-20(n). In addition to engagement with the honeypot, conviction can be based on a score above a conviction score threshold based on a number of violations of the security policy, for example, and other methods of convicting the one of the client devices 20(1)-20(n) can also be used.

Once convicted, the WAF device 14 optionally generates and sends an alert to the administrator device 24 and initiates a deception stage in which barriers are established to waste resource of, and deter, the attacker. Optionally, after expiration of a particular time period and/or based on an obtained reputation score for the one of the client devices 20(1)-20(n), network traffic originating from the one of the client devices 20(1)-20(n) is blocked by the WAF device 14 in this example.

With this technology, network attackers are more effectively identified and managed to reduce the impact of targeted, manual attacks on protected web applications. In particular, honeypots are used to convict client devices that are identified as possibly originating an attack based on scores associated with a behavioral analysis of the client devices with respect to the protected web application. Once convicted, deceptive responses are utilized to prevent reverse engineering of the security policy.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for network security implemented by a network security system comprising one or more attack mitigation apparatuses, web application firewall devices, behavior analysis devices, server devices, or client devices, the method comprising:
   obtaining a web application resource associated with a protected web application from a server following receipt of a request for the web application resource from a client; and
   determining whether the client is suspicious by comparing a conviction score assigned to the client against a conviction score threshold and a suspicion score assigned to the client against a suspicion score threshold, wherein the conviction score is generated based on a number of violations of a security policy, wherein the suspicion score is a level of confidence that the client is malicious, and when the determination indicates the client is suspicious:
      modifying the web application resource by injecting a honeypot into source code of the web application resource, wherein the honeypot is configured to operate as a conviction trap by presenting the client with an option of engaging a link leading to a predefined location; and
      sending a response to the request for the web application resource to the client, wherein the response comprises the modified web application resource.

2. The method of claim 1, further comprising:
   determining whether the client has engaged the honeypot based on a subsequent request received from the client after the response is sent to the client; and
   marking the client as convicted, when the determination indicates the client has engaged the honeypot.

3. The method of claim 1, further comprising:
   determining whether the client is convicted; and
   sending a deceptive response to the client, when the determination indicates the client is convicted.

4. The method of claim 3, further comprising delaying a return of the response to the client, sending an error message to the client, dropping the request for the web application resource, sending a fake response to the client, introducing one or more random headers into the response before the response is sent to the client, or sending a partial version of the web application resource to the client, in order to send the deceptive response to the client.

5. The method of claim 1, further comprising:
   analyzing a behavior of the client with respect to the protected web application;
   updating a stored conviction score and a stored suspicion score for the client based on the analysis;
   determining whether the stored conviction score for the client exceeds the conviction score threshold or whether the stored suspicion score for the client exceeds the suspicion score threshold;
   marking the client as convicted, when the determination indicates the stored conviction score for the client exceeds the conviction score threshold; and marking the client as suspicious, when the determination indicates the stored suspicious score for the client exceeds the suspicious score threshold.

6. An attack mitigation apparatus, comprising memory comprising programmed instructions stored thereon and one or more processors configured to execute the stored programmed instructions to:

obtain a web application resource associated with a protected web application from a server following receipt of a request for the web application resource from a client; and determine whether the client is suspicious by comparing a conviction score assigned to the client against a conviction score threshold and a suspicion score assigned to the client against a suspicion score threshold, wherein the conviction score is generated based on a number of violations of a security policy, wherein the suspicion score is a level of confidence that the client is malicious, and when the determination indicates the client is suspicious:

modify the web application resource by injecting a honeypot into source code of the web application resource, wherein the honeypot is configured to operate as a conviction trap by presenting the client with an option of engaging a link leading to a predefined location; and send a response to the request for the web application resource to the client, wherein the response comprises the modified web application resource.

7. The attack mitigation apparatus of claim 6, wherein the one or more processors are further configured to execute the stored programmed instructions to:

determine whether the client has engaged the honeypot based on a subsequent request received from the client after the response is sent to the client; and mark the client as convicted, when the determination indicates the client has engaged the honeypot.

8. The attack mitigation apparatus of claim 6, wherein the one or more processors are further configured to execute the stored programmed instructions to:

determine whether the client is convicted; and send a deceptive response to the client, when the determination indicates the client is convicted.

9. The attack mitigation apparatus of claim 8, wherein the one or more processors are further configured to execute the stored programmed instructions to delay a return of the response to the client, sending an error message to the client, drop the request for the web application resource, send a fake response to the client, introduce one or more random headers into the response before the response is sent to the client, or send a partial version of the web application resource to the client, in order to send the deceptive response to the client.

10. The attack mitigation apparatus of claim 6, wherein the one or more processors are further configured to execute the stored programmed instructions to:

analyze a behavior of the client with respect to the protected web application;

update a stored conviction score and a stored suspicion score for the client based on the analysis;

determine whether the stored conviction score for the client exceeds the conviction score threshold or whether the stored suspicion score for the client exceeds the suspicion score threshold;

mark the client as convicted, when the determination indicates the stored conviction score for the client exceeds the conviction score threshold; and mark the client as suspicious, when the determination indicates the stored suspicious score for the client exceeds the suspicious score threshold.

11. A non-transitory computer readable medium having stored thereon instructions for network security comprising executable code that, when executed by one or more processors, causes the one or more processors to:

obtain a web application resource associated with a protected web application from a server following receipt of a request for the web application resource from a client; and determine whether the client is suspicious by comparing a conviction score assigned to the client against a conviction score threshold and a suspicion score assigned to the client against a suspicion score threshold, wherein the conviction score is generated based on a number of violations of a security policy, wherein the suspicion score is a level of confidence that the client is malicious, and when the determination indicates the client is suspicious:

modify the web application resource by injecting a honeypot into source code of the web application resource, wherein the honeypot is configured to operate as a conviction trap by presenting the client with an option of engaging a link leading to a predefined location; and send a response to the request for the web application resource to the client, wherein the response comprises the modified web application resource.

12. The non-transitory computer readable medium of claim 11, wherein the executable code, when executed by the one or more processors further causes the one or more processors to:

determine whether the client has engaged the honeypot based on a subsequent request received from the client after the response is sent to the client; and mark the client as convicted, when the determination indicates the client has engaged the honeypot.

13. The non-transitory computer readable medium of claim 11, wherein the executable code, when executed by the one or more processors further causes the one or more processors to:

determine whether the client is convicted; and send a deceptive response to the client, when the determination indicates the client is convicted.

14. The non-transitory computer readable medium of claim 13, wherein the executable code, when executed by the one or more processors further causes the one or more processors to delay a return of the response to the client, send an error message to the client, drop the request for the web application resource, sending a fake response to the client, introduce one or more random headers into the response before the response is sent to the client, or send a partial version of the web application resource to the client, in order to send the deceptive response to the client.

15. The non-transitory computer readable medium of claim 11, wherein the executable code, when executed by the one or more processors further causes the one or more processors to:

analyze a behavior of the client with respect to the protected web application;

update a stored conviction score and a stored suspicion score for the client based on the analysis;

determine whether the stored conviction score for the client exceeds the conviction score threshold or whether the stored suspicion score for the client exceeds the suspicion score threshold;

mark the client as convicted, when the determination indicates the stored conviction score for the client exceeds the conviction score threshold; and mark the client as suspicious, when the determination indicates the stored suspicious score for the client exceeds the suspicious score threshold.

16. A network security system, comprising one or more attack mitigation apparatuses, web application firewall devices, behavior analysis devices, server devices, or client devices with memory comprising programmed instructions stored thereon and one or more processors configured to execute the stored programmed instructions to:

obtain a web application resource associated with a protected web application from a server following receipt of a request for the web application resource from a client; and determine whether the client is suspicious by comparing a conviction score assigned to the client against a conviction score threshold and a suspicion score assigned to the client against a suspicion score threshold, wherein the conviction score is generated based on a number of violations of a security policy, wherein the suspicion score is a level of confidence that the client is malicious, and when the determination indicates the client is suspicious:

modify the web application resource by injecting a honeypot into source code of the web application resource, wherein the honeypot is configured to operate as a conviction trap by presenting the client with an option of engaging a link leading to a predefined location; and send a response to the request for the web application resource to the client, wherein the response comprises the modified web application resource.

17. The network security system of claim 16, wherein the one or more processors are further configured to execute the stored programmed instructions to:

determine whether the client has engaged the honeypot based on a subsequent request received from the client after the response is sent to the client; and mark the client as convicted, when the determination indicates the client has engaged the honeypot.

18. The network security system of claim 16, wherein the one or more processors are further configured to execute the stored programmed instructions to:

determine whether the client is convicted; and send a deceptive response to the client, when the determination indicates the client is convicted.

19. The network security system of claim 16, wherein the one or more processors are further configured to execute the stored programmed instructions to delay a return of the response to the client, send an error message to the client, drop the request for the web application resource, sending a fake response to the client, introduce one or more random headers into the response before the response is sent to the client, or send a partial version of the web application resource to the client, in order to send the deceptive response to the client.

20. The network security system of claim 16, wherein the one or more processors are further configured to execute the stored programmed instructions to:

analyze a behavior of the client with respect to the protected web application;

update a stored conviction score and a stored suspicion score for the client based on the analysis;

determine whether the stored conviction score for the client exceeds the conviction score threshold or whether the stored suspicion score for the client exceeds the suspicion score threshold;

mark the client as convicted, when the determination indicates the stored conviction score for the client exceeds the conviction score threshold; and mark the client as suspicious, when the determination indicates the stored suspicious score for the client exceeds the suspicious score threshold.

\* \* \* \* \*